United States Patent [19]

Ma

[11] 4,015,075
[45] Mar. 29, 1977

[54] TELEVISION RECEIVER AUTOMATIC FREQUENCY CONTROL SYSTEM

[75] Inventor: John Y. Ma, Glenview, Ill.

[73] Assignee: Zenith Radio Corporation, Chicago, Ill.

[22] Filed: Oct. 2, 1975

[21] Appl. No.: 619,084

[52] U.S. Cl. ............................................. 358/158
[51] Int. Cl.² .................................... H04N 5/60
[58] Field of Search ... 178/5.8 AF, 5.8 R, DIG. 15; 325/418, 422, 423, 438, 453, 464, 465

[56] References Cited

UNITED STATES PATENTS

| | | | |
|---|---|---|---|
| 3,045,060 | 7/1962 | Meyer | 178/5.8 R |
| 3,459,887 | 8/1969 | Baker | 178/5.8 R |
| 3,469,025 | 9/1969 | Evans | 178/5.8 R |
| 3,737,565 | 6/1973 | Ma | 178/5.8 R |
| 3,940,554 | 2/1976 | Masuda | 178/5.8 AF |
| 3,949,158 | 4/1976 | Rzeszewski | 178/5.4 AF |

*Primary Examiner*—John C. Martin
*Attorney, Agent, or Firm*—Nicholas A. Camasto

[57] ABSTRACT

A television receiver includes a tuner, IF amplifier, video and audio processing circuitry and deflection circuits. Two quadrature detectors are driven from the IF amplifier, one tuned to the sound IF carrier frequency and the other tuned to the picture IF carrier frequency. A combining circuit accepts only negative-going error voltages from the first detector and only positive-going error voltages from the second detector to produce an AFC with a response curve defined by the sound IF frequency at one end and the picture IF frequency at the other end. The output of the combining circuit supplies a voltage controllable oscillator in the tuner.

9 Claims, 6 Drawing Figures

TELEVISION RECEIVER AUTOMATIC FREQUENCY CONTROL SYSTEM

BACKGROUND OF THE INVENTION

This invention relates to automatic frequency control circuits for television receivers operating on the superheterodyne principle. Such television receivers have tuners capable of receiving transmitted television signals, heterodyning them with locally generated oscillator signals and producing constant intermediate frequency (IF) signals for processing. This heterodyning or frequency transposition process is well known.

Each government grants frequency allocations and establishes signal standards for all television transmitters operating within its jurisdiction. While the present invention is useful in any system with signal carriers spaced a predetermined distance apart and receivers generating fixed IF frequencies, its use in conjunction with the system promulgated by the Federal Communications Commission (FCC) in the United States will be discussed.

According to FCC regulations, broadcasters must maintain a frequency spacing of 4.5 MHz between the picture and sound carriers. Thus, while the frequencies of the carriers differ with different channel allocations (sound carrier is higher in frequency than the picture carrier), their frequency separation is constant. In the receiver, a local oscillator is adjusted (generally to a frequency higher than the received picture carrier frequency) to heterodyne with the picture carrier and produce an IF picture carrier of 45.75 MHz. Since the sound carrier is displaced 4.5 MHz from the picture carrier, the IF sound carrier has a frequency of 41.25 MHz. (The sound IF carrier becomes lower in frequency than the picture IF carrier because of the heterodyning process.)

The resulting IF signals are translated through appropriate television receiver circuitry and detected. In general practice, a discriminator or detector having a tuning or center frequency of 45.75 MHz, corresponding to the picture IF, is supplied with the IF signal and develops an error voltage dependent upon the polarity of the difference between the received picture IF carrier and the center frequency of the discriminator. In some situations, the magnitude of the error voltage is also a factor. The error voltage is fed to appropriate circuitry in the tuner for controlling the frequency of the oscillator based upon the polarity and/or magnitude thereof. The oscillator frequency changes, in response to the error voltage, to bring the received signal picture IF carrier frequency closer to the center frequency of the discriminator. Equilibrium is reached when the error voltage produced and the system gain operate on the oscillator to maintain tuning close to the discriminator center frequency, at which point the receiver should be properly tuned, i.e., to within its specified frequency tolerance.

As is well known, AFC systems may be designed to exhibit a variety of characteristics with specific characteristics appropriately emphasized according to need. For example, the main criterion for the AFC system may be the frequency range over which it can "pull in" a signal, which denotes the amount of oscillator frequency change available for tuning the receiver. The "holding" or "lock" range of the AFC system is also of importance and is a measure of the amount of the oscillator frequency drift (or received signal frequency change) which may be tolerated before noticeably distorting the receiver video display or audio accompaniment.

Needless to say, numerous types and variations of AFC circuits have been used over the years. In general, they have given acceptable performance and have proven a very useful feature on a television receiver. With the advent of color television and the NTSC signal with its color subcarrier, the requirements for AFC circuits become more stringent because slight detuning of the receiver may give rise to objectionable color shifts in the reproduced image.

The very recent trend to electronic type television tuning systems has added still another dimension to the frequency control problem. Such systems may not have an auxiliary control to enable the operator to manually adjust tuning to compensate for oscillator mistuning or signal conditions. Unlike their predecessor mechanical detent tuners, in which the nominal oscillator frequency is established by a tuning position—which also indicates the channel number of the signal tuned at that position—the electronic system may derive the channel number from the incoming signal, a preprogrammed memory or from the oscillator frequency. In the old system, the fine tuning control enabled reception of the proper television signal even though the nominal oscillator frequency substantially differed from its correct value. Generally, the AFC circuit was only made operative after tuning to the desired signal, for the sole purpose of maintaining that tuning. In many receivers with all-electronic tuning systems, fine tuning controls are available only at greatly increased cost and system complexity. Further in all-electronic tuning systems which derive the channel number of the received signal from either a memory or from the oscillator frequency, drift, either in the oscillator or received signal, may destroy the correlation between channel number and received signal.

A further problem arises because of the large number of television stations now in operation, both in the VHF and UHF bands. In the early days of television, frequency allocations were made with a view to avoidance of interference from adjacent channel signals. Now, however, in many parts of the country, it is not uncommon for receivers to be subject to very strong adjacent channel signals and consequent interference. Also with the growth of CATV and MATV, it is not unusual to have large numbers of adjacent channels because of their signal transposition to the VHF band. To add even more complexity, many MATV translated signals do not have the correct frequencies for the designated channels and consequently the picture carrier frequencies may deviate substantially. In these instances a true no-fine-tune receiver needs an AFC which is capable of differentiating between desired and non-desired signals—an enormously complicated systems problem.

Thus these problems associated with color television, electronic tuning, adjacent channel signals and non-standard signals with off-frequency carriers impose stringent demands on AFC systems. The art, in turn, has labored to improve the pull-in, hold-in and signal recognition capabilities of AFC systems. What the art has failed to do is to develop a new kind of AFC system which takes advantage of the fact that the picture and sound IF carriers are both present and spaced a predetermined distance apart. As will be seen, the AFC system of the invention utilizes both the IF sound and picture carriers for tuning the oscillator.

U.S. Pat. No. 3,459,887 dated Aug. 5, 1969 to R. F. Baker and assigned to Zenith Radio Corporation discloses an AFC system which utilizes the presence of the sound IF carrier to avoid an ambiguity in tuning and assist pull-in when the oscillator is tuned too high. The response attained with the Baker system is indicated by the solid line curve in FIG. 3A of the drawing and contains a so-called "negative hook" in the vicinity of the sound IF carrier frequency. This sharpens the response in this area and eliminates a condition where the AFC circuit might produce equal and opposite error voltages which would preclude moving the oscillator frequency into proper tuning. As will be seen, however, the sound IF carrier is only used in the event of serious mistuning in one direction and is not a contributing factor in maintaining proper tuning. It will be appreciated that serious mistuning with prior art AFC systems represents a comparatively small frequency differential. On the contrary, the wide range AFC system of the invention spans 4.5 MHz and has a response characteristic sharply bounded by frequencies corresponding to the IF sound and picture carrier frequencies. The system of the invention eliminates ambiguities in tuning and nullifies the effects of adjacent channel signal interference.

OBJECTS OF THE INVENTION

The principal object of this invention is to provide a novel AFC system for a television receiver.

Another object of this invention is to provide a television receiver having enhanced signal pull-in and hold-in characteristics.

A further object of this invention is to provide an AFC system which is immune to adjacent channel signals.

SUMMARY OF THE INVENTION

A wide range AFC circuit for use in a television receiver has separate picture and sound detectors and exhibits an amplitude versus frequency response characteristic having a positive voltage portion and a negative voltage portion. The characteristic is defined at its extremities by detection slopes at the frequencies corresponding to the sound and picture IF carriers of a translated television signal respectively. The polarity of error voltage produced by the AFC circuit is dependent upon the portion in which either the sound or picture IF signal frequency falls.

BRIEF DESCRIPTION OF THE DRAWINGS

A better understanding of how the above and other objects of the invention are fulfilled will be had by reading the following description in conjunction with the drawings in which.

DESCRIPTION OF THE PREFERRED EMBODIMENT

Figure 1:
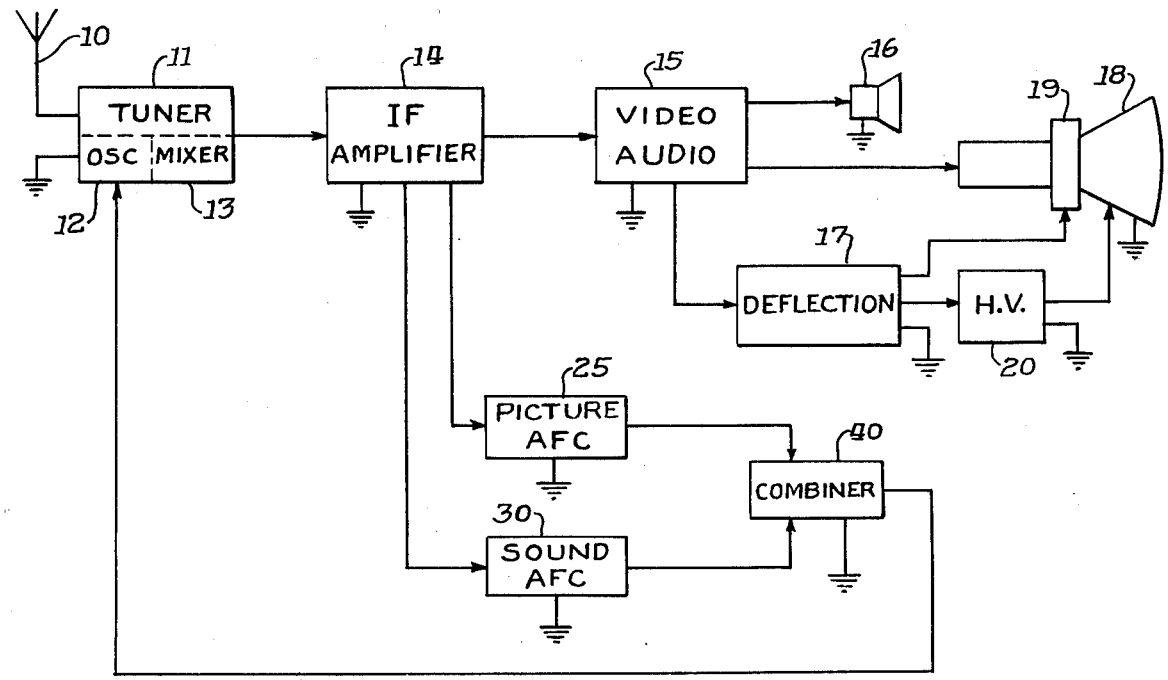
FIG. 1 represents a block diagram of a television receiver as constructed in accordance with the invention.

Referring to FIG. 1, a television receiver constructed in accordance with the invention has a tuner 11 including an oscillator 12 and a mixer 13. An antenna 10 is coupled between the tuner and ground for receiving airborne television signals. Tuner 11 is coupled to an IF amplifier 14 which, in turn, is coupled to a video and audio processing circuit 15, a first output of which is coupled to a speaker 16, a second output of which is coupled to a deflection circuit 17 and a third output of which is coupled to a picture tube 18. Deflection circuit 17, in turn, has one output coupled to a deflection yoke 19 located on picture tube 18 and another output coupled to a high voltage circuit 20, the output of the latter being coupled to picture tube 18. IF amplifier 14 has two additional outputs, one coupled to a picture AFC circuit 25 and another to a sound AFC circuit 30. The AFC circuits are coupled to a combining circuit 40, the output of which is coupled to oscillator 12 in the tuner.

In operation, one of the broadcast signals in the television band is selected or "tuned" by adjustment of the frequency of oscillator 12 such that when it and the incoming signal are heterodyned in mixer 13, they produce intermediate frequency signals of proper frequency. The IF signals are amplified in IF amplifier 14 and supplied to video and audio processing circuit 15 where they are detected and amplified. Deflection circuit 17 and high voltage circuit 20 are in all respects conventional and together develop the necessary horizontal and vertical scanning currents for application to yoke 19, as well as the necessary high voltage for picture tube 18.

The described receiver may be either of the monochrome or color variety. For a color television receiver, additional color processing circuitry would be included in video and audio processing circuit 15 and, depending upon the type of color picture tube used, convergence signals developed and applied to appropriate convergence apparatus (not shown) on picture tube 18 for controlling the electron beams therein. Whether in fact a monochrome or a color receiver is used is of no importance in consideration of the invention which pertains to an AFC circuit for developing a control voltage to maintain tuner 11 properly tuned.

No detailed circuitry of tuner 11, oscillator 12 or mixer 13 is shown, since it will be apparent to those skilled in the art that the tuner may take the form of any of a number of well-known superheterodyne type television receiver tuners, preferably ones incorporating variable capacitance diodes. Such variable capacitance diodes (varactors) exhibit changes in capacitance with DC bias changes which, when employed as the capacitance (or part of the capacitance) of a tuned circuit, cause an adjustment of tuning. Further, the invention is specifically concerned with a wide range automatic frequency control circuit arrangement having a particular response characteristic which may be used in conjunction with any number of IF amplifier and tuner configurations.

The IF amplifier signal is supplied to picture AFC circuit 25 which may comprise any of a number of well-known detector arrangements tuned to detect signals in the vicinity of the picture IF carrier frequency. Similarly, the IF signal is supplied to sound AFC circuit 30 which preferably includes the same type of detector circuit, but tuned to a frequency corresponding to the sound IF carrier. In the system under discussion, the picture IF carrier frequency is 45.75 MHz and the sound IF carrier frequency is 41.25 MHz. As will be seen in conjunction with FIGS. 2 and 3, combining circuit 40 selects only positive-going error voltages or signals from picture AFC circuit 25 and only negative-going error voltages from sound AFC circuit 30 to produce a composite AFC response curve sharply defined at its extremities by frequencies corresponding to the picture and sound IF carriers.

Figure 2:
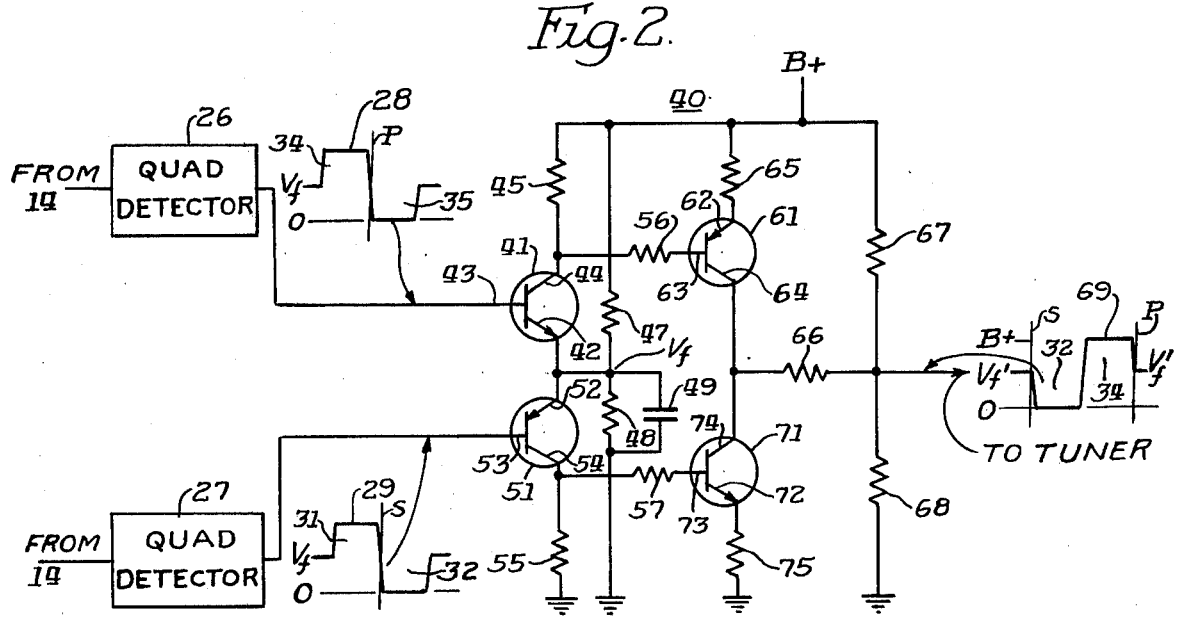
FIG. 2 represents a schematic diagram of a portion of the novel AFC circuit of the invention.

In FIG. 2 combining circuit 40 is shown in detail and includes four transistors. A first picture AFC transistor 41, having an emitter electrode 42, a base electrode 43 and a collector electrode 44 is cascaded with a first sound AFC transistor 51 having an emitter electrode 52, a base electrode 53 and a collector electrode 54. Transistor 41 is of the NPN type and transistor 51 of the PNP type. Collector 44 of transistor 41 is connected through a load resistor 45 to a source of positive DC voltage B+. The emitter of transistor 41 is connected to the emitter of transistor 51. Collector 54 of transistor 51 is connected to ground potential through a load resistor 55. The junction of emitters 42 and 52 is connected to the junction of a voltage divider formed by a pair of resistors 47 and 48 connected between B+ and ground. A capacitor 49 is coupled across divider resistor 48 and the junction of the transistor emitters is established at substantially one half B+ voltage.

A quadrature type detector 26 is supplied from IF amplifier 14 and, in turn, supplies signals to base 43 of transistor 41. Similarly, a quadrature type detector 27 is supplied from IF amplifier 14 and supplies signals to base 53 of transistor 51. It will be recognized that quadrature detector 26 is a specific implementation of picture AFC circuit 25 in FIG. 1 and quadrature detector 27 a specific implementation of sound AFC circuit 30. Quadrature type detectors are well-known in the art and are selected for the preferred embodiment because of their steep detection slopes. Other detectors may be used, however, and the invention is not limited to any particular detector or discriminator.

A second picture AFC transistor 61 having an emitter electrode 62, a base electrode 63 and a collector electrode 64 is cascaded with a second sound AFC transistor 71 having an emitter electrode 72, a base electrode 73 and a collector electrode 74. Transistor 61 is of the PNP type and transistor 72 of the NPN type. Emitter 62 is connected through a load resistor 65 to B+ and emitter 72 through a load resistor 75 to ground. The collectors of the two transistors are connected together and their junction connected, through a resistor 66, to the junction of a voltage divider comprising a pair of resistors 67 and 68 coupled between B+ and ground. The output signal of transistor 41 is taken from its collector 44 and supplied to base 63 of transistor 61 through a resistor 56. Similarly, the output of transistor 51 is taken from its collector 54 and supplied to base 73 of transistor 71 through a resistor 57. The junction of voltage divider resistors 67 and 68 is connected to appropriate circuitry to control oscillator 12 in tuner 11.

In operation, the signal response characteristic of quadrature detector 26 is substantially as indicated by waveform 28. Waveform 28 has a generally square wave configuration with a transition point occurring about a vertical line P, signifying the IF picture carrier frequency which, in the system under discussion, occurs at 45.75 MHz. Thus quadrature detector 26 has a center or tuning frequency of 45.75 MHz and, for incoming signal frequencies less than its center frequency, produces a positive-going error voltage. For incoming signals greater than 45.75 MHz, quadrature detector 26 produces a negative-going error voltage.

Quadrature detector 27 has a substantially identical response characteristic 29 to that of quadrature detector 26. They differ in that response characteristic 29 has a transition point about a vertical line S which represents the 41.25 MHz frequency of the IF sound carrier. For signals less than 41.25 MHz, quadrature detector 27 produces positive-going error voltages and for signals greater than this frequency, it produces negative-going error voltages.

The error voltage from quadrature detector 26 is supplied to the base of the first picture AFC transistor 41. Because of its connection to the junction of voltage divider resistors 47 and 48, the emitter of transistor 41 is at $V_f$ which is substantially B+/2 voltage. Transistor 41 is driven conductive when its base voltage exceeds its emitter voltage by the base-emitter junction contact potential. Thus, transistor 41 is driven conductive for positive-going error voltages from quadrature detector 26.

The positive portion of the response waveform 28 is indicated by reference character 34. For simplicity, assume that a signal having the shape of waveform 28 (which is a response characteristic and not a signal) is applied to transistor 41. Conduction by transistor 41 during positive portion 34 results in a negative-going replica of portion 34 appearing at collector 44 of transistor 41. The negative portion 35 of waveform 28 is not translated by transistor 41. Capacitor 49 coupled across voltage divider resistor 48 decouples the signal to maintain the junction of emitters 42 and 52 at AC ground potential. Thus, while the junction is held at a DC potential corresponding to $V_f$ (substantially B+/2), it is at an AC potential of zero.

The signal appearing at collector 44 is applied to base 63 of second picture AFC transistor 61. The junction of voltage divider resistors 67 and 68 maintains the junction of collectors 64 and 74 of transistor 61 and transistor 71 at $V_{f'}$. It will be seen that the ratio of resistors 67 and 68 controls the magnitude of $V_{f'}$ which may be adjusted to equalize the sensitivity of the AFC frequency response. As transistor 61 conducts, its collector potential rises toward B+ and develops an opposite polarity replica of the negative input signal on its base (which is an amplified version of portion 34 of waveform 28).

In similar fashion, transistors 51 and 71 operate on the signal output of quadrature detector 27 to develop a positive-going replica of negative portion 32 of waveform 29 at collector 54 of transistor 51 and a negative-going replica of the latter waveform (amplified version of original portion 32) at collector 74 of transistor 71. The combined waveform indicated by reference character 69 thus includes a negative-going portion 32 and a positive-going portion 34 between frequency boundaries corresponding to the IF sound carrier frequency S and the picture IF carrier frequency P. While the general shape of waveform 69 is similar to that of waveforms 28 and 29 (although of inverted polarity), the center detection frequencies P and S of waveforms 28 and 29 appear at the outer bounds of waveform 69. This novel AFC response characteristic will be described in greater detail with reference to FIGS. 3A–3D.

Figure 3A:
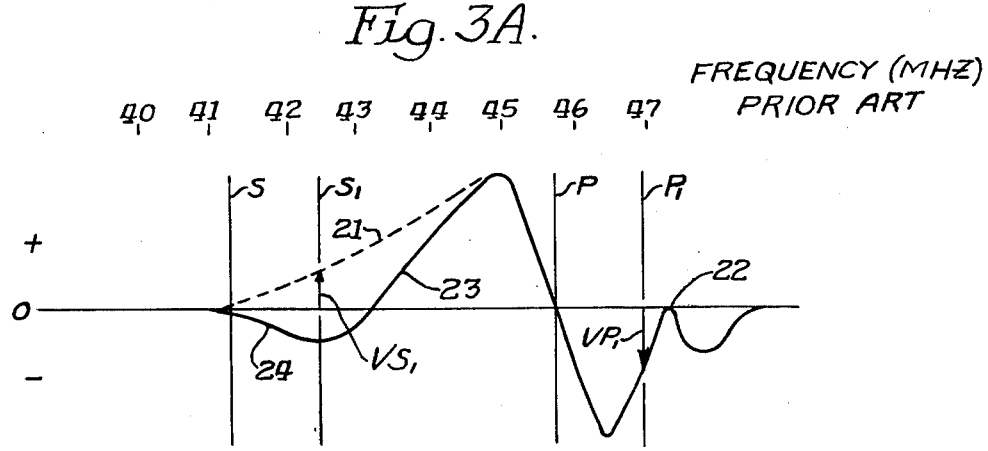
FIG. 3, consisting of 3A through 3D, depicts a response curve of a prior art AFC system and curves of the wide range AFC system of the invention.

The dashed line AFC response curve 21 and solid-line curve 23 in FIG. 3A are indicated as prior art. The horizontal legend from 40–47 represents frequency in MHz and applies to FIGS. 3B–3D as well as to FIG. 3A. The ordinates of all the figures are measured from a zero base line with the lower portions indicated as negative and the upper portions indicated as positive. It will be recognized that the zero base line is a reference only and that in practice, the zero base line may be at some positive or negative potential such as $V_f$. Curves 21 and 23 substantially overlap over their right-hand portions. Curve 21 represents the frequency response characteristic of conventional AFC systems, whereas curve 23 is the response of the Baker AFC circuit mentioned above. The vertical lines labelled S, $S_1$, P and $P_1$ represent the sound and picture IF carriers of two "tunings" of a television signal which are displaced by a frequency corresponding to the distance between S and $S_1$. Notch 22 in the waveform, while not specifically shown in the Baker patent, is present and represents an adjacent channel sound carrier trap incorporated in substantially all color television receivers of this type.

The negative arrow $VP_1$ represents an error voltage generated by an AFC system exhibiting response curve 21 in the presence of a poorly-tuned television signal with a picture IF carrier falling at $P_1$. Similarly, voltage $VS_1$ is the error signal generated by that same television signal due to the IF sound carrier falling at $S_1$. It may be readily seen that under certain improper tuning conditions $VP_1$ and $VS_1$ may become equal to each other and result in a zero error voltage.

As fully explained in the above-mentioned Baker patent, circuitry was added to derive a so-called "negative hook" indicated by reference character 24, which resulted in response waveform 23. An AFC circuit with this response curve eliminated the ambiguity by precluding development of an error signal by the sound IF carrier which could offset the error signal developed by the picture IF carrier. It should be clearly noted that though Baker used the sound IF carrier to assist tuning, at least for tuning in one direction, the sound IF carrier plays no part in actual tuning of the receiver.

Figure 3B:
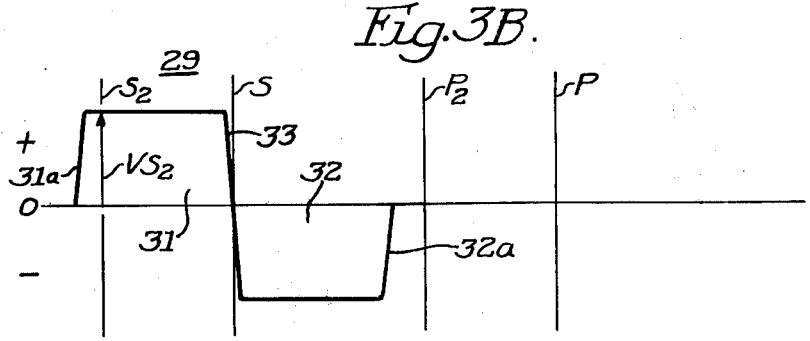
Figure 3C:
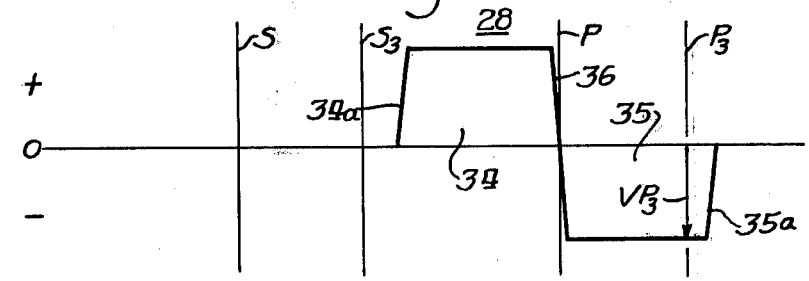
Figure 3D:
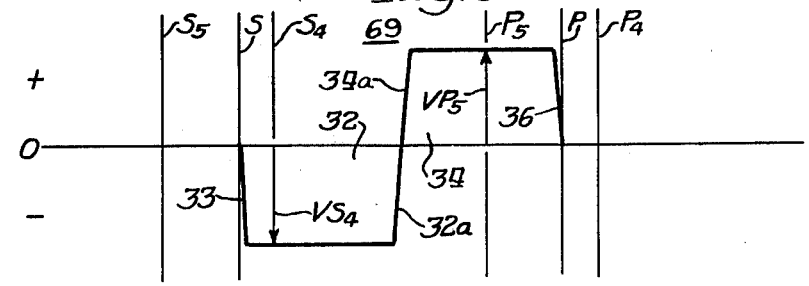

On the contrary, as will be clearly seen in analysis of FIG. 3B through FIG. 3D, the wide range AFC system of the invention places equal reliance on the sound IF carrier and the picture IF carrier to effect proper tuning of the television receiver.

In FIG. 3B, waveform 29 represents the output response of quadrature detector 27 which, it will be recalled, has a center frequency of 41.25 MHz, corresponding to the sound IF carrier. The positive slope of portion 31 is labelled 31a and the negative slope portion is labelled 33, which will be recognized as part of the detecting slope (the negative feedback section of waveform 29). The positive slope of portion 32 is labelled 32a and the other boundary of portion 32 is defined by the lower half of negative slope 33. It will be seen that slope 33 is "centered" about vertical line S corresponding to the sound IF carrier frequency of 41.25 MHz. The quadrature detector having a response indicated by waveform 29 is in all respects conventional. The "flat top" is readily attainable either within the detector itself or with suitable limiting type circuitry. While the flat top response is desirable, it is not necessary to successful practice of the invention.

Under correct tuning conditions, combining the oscillator output with the incoming signal will generate an IF sound carrier corresponding to vertical line S of FIG. 3B and an IF picture carrier corresponding to line P. A quadrature detector exhibiting response characteristic 29 will, therefore, produce no error voltage. However, should the IF sound carrier frequency fall to the left of S, for example, to vertical line $S_2$, the quadrature detector would produce a positive-going error voltage as indicated by the arrow $VS_2$. The corresponding IF picture carrier would fall at $P_2$ and not produce any error voltage as it is outside the response range of the detector. It will readily be seen that, should receiver tuning be such that the IF signals fall to the right of the line S, a negative-going error correction voltage will be produced.

In FIG. 3C, an identical—though displaced in frequency—response characteristic 28 is shown. Curve 28 corresponds to the envelope of error voltages produced by quadrature detector 26 which is tuned to 45.75 MHz (IF picture carrier frequency). Curve 28 has a positive portion 34 and a negative portion 35 with the centrally located detecting portion 36 of negative slope being centered about a vertical line P corresponding to the ideal picture IF carrier frequency of 45.75 MHz. As discussed with reference to the response curve of FIG. 3B, in the presence of a signal with a picture IF carrier falling at line $P_3$, a negative-going correction voltage, represented by arrow $VP_3$ is produced. The corresponding sound IF carrier falls at line $S_3$ and doesn't develop an error voltage.

Due to combining circuit 40, the negative portion of response curve 29 is added to the positive portion of response curve 28 to produce a composite response curve 69 for the wide band AFC circuit of the invention, as indicated in FIG. 3D. Curve 69 has a negative portion 32 and a positive portion 34 with a negative-slope detecting portion 33 and a negative-slope detecting portion 36 at its extremities. As indicated by the vertical lines S and P (again representing respectively the frequencies corresponding to the ideal IF sound and picture carriers) with a properly tuned receiver, the AFC circuit of the invention with this response characteristic produces no correction voltage. If the tuner is detuned to produce signals falling at lines $S_4$ and $P_4$, portion 32 develops a negative-going correction voltage $VS_4$ for adjusting the oscillator frequency. Note that there is no positive-going correction voltage developed because $P_4$ is outside the response characteristic. Should the tuner be detuned in the opposite direction and produce, for example, IF signals corresponding to lines $S_5$ and $P_5$, the signal component at $S_5$ will produce no correction voltage, but the signal component at $P_5$ will produce a correction voltage $VP_5$ of positive polarity. As a result the oscillator frequency is changed in the appropriate direction to bring the IF picture carrier to vertical line P and the IF sound carrier to vertical line S.

It will be recognized by those familiar with automatic frequency control circuits that a negative slope in the response curve is required for equilibrium. Consequently, the central portion of waveform 69 consisting of 32a and 34a is a line of positive slope upon which the AFC system cannot stabilize. It will further be seen that although identical positive and negative portions are indicated, the composite response curve need not have this symmetry. Should it be desired to favor "pulling" from one side, the portions may be altered accordingly to enhance the pull-in characteristics to favor high or low mistuning of the oscillator.

It will also be immediately apparent that adjacent channel signals (or other interfering signals) will have substantially no effect upon the performance of the wide range AFC circuit of the invention. Since the frequency distance between vertical lines S and P is always 4.5 MHz, the AFC system of the invention exhibits an exceptional pull-in range of ± 2.25 MHz and further is not "confused" by adjacent channel signals.

What has been described is a wide range AFC system for a superheterodyne type of television receiver in which a fixed frequency difference is maintained between developed IF sound and picture carriers. This system is positive in its operation and effectively ignores any interference from adjacent channels.

It is recognized that numerous modifications and changes may be made in the described preferred embodiment of the invention without departing from the true spirit and scope thereof as set forth in the following claims.

What is claimed is:

1. A television receiver for receiving television signals having RF picture and sound carriers spaced a predetermined distance apart comprising: means translating said received television signals including; a tuner having a controllable oscillator, a mixer heterodyning the output signal of the oscillator with said received television signal to convert said RF carriers into picture and sound IF carriers of fixed intermediate frequencies, and an IF amplifier; and AFC means coupled between said IF amplifier and said controllable oscillator for producing correction voltages for said oscillator, said AFC means comprising a first detector detecting signals at frequencies corresponding to said picture IF carrier frequency, a second detector detecting signals at frequencies corresponding to said sound IF carrier frequency and combining means supplied from said first and second detectors for producing a composite AFC amplitude versus frequency response characterized by portions of opposite polarity between limits defined by said picture and sound IF carrier frequencies.

2. A television receiver as set forth in claim 1, wherein said response curve has detection slopes at frequencies corresponding to said picture and sound IF carriers and substantially equal size opposite polarity portions.

3. A wide range AFC circuit including separate picture and sound detection means, for use in a television receiver, exhibiting an amplitude versus frequency response characteristic having two portions and producing a first polarity correction voltage for signal frequencies falling in one of said portions and a second polarity correction voltage for signal frequencies falling in the other of said portions; said wide range being bounded by detection slopes at the nominal IF frequencies of the sound and picture IF carriers of a translated television signal.

4. A wide range AFC circuit as claimed in claim 3, including combining means coupled to said first and said second detector means for combining portions of their respective output voltages.

5. A wide range AFC circuit as claimed in claim 4, wherein said combining means accepts output voltages of one polarity from said first detector means and output voltages of opposite polarity from said second detector means.

6. A wide range AFC circuit as claimed in claim 4, wherein the response characteristics of said first and second detector means are similar with steep detection slopes at their respective detection frequencies, the different polarity portions of said wide range response characteristic being substantially similar in size and shape.

7. A wide range AFC circuit as claimed in claim 5, wherein said first and said second detector means each include a quadrature detector.

8. A wide range AFC circuit as claimed in claim 5, wherein said combining means comprises a pair of semiconductor circuit elements for amplifying said opposite polarity portions of the outputs of said detector means.

9. A wide range AFC circuit as claimed in claim 6, wherein said translated television signal is an NTSC television signal and said wide range comprises 4.5 MHz.

* * * * *